United States Patent
Yamaguchi

(10) Patent No.: US 10,086,456 B2
(45) Date of Patent: Oct. 2, 2018

(54) WIRE ELECTRIC DISCHARGE MACHINE CAPABLE OF MACHINING VARIOUS SURFACES

(71) Applicant: FANUC Corporation, Yamanashi (JP)

(72) Inventor: Meguru Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 15/244,000

(22) Filed: Aug. 23, 2016

(65) Prior Publication Data

US 2017/0056991 A1 Mar. 2, 2017

(30) Foreign Application Priority Data

Aug. 24, 2015 (JP) .................................. 2015-164519

(51) Int. Cl.
| | | |
|---|---|---|
| *B23H 7/06* | (2006.01) | |
| *B23H 7/10* | (2006.01) | |
| *B25J 11/00* | (2006.01) | |

(52) U.S. Cl.
CPC ............ *B23H 7/065* (2013.01); *B23H 7/105* (2013.01); *B25J 11/00* (2013.01); *Y10S 901/42* (2013.01)

(58) Field of Classification Search
CPC . B23H 7/065; B23H 7/06; B23H 7/105; B25J 11/00; Y10S 901/41; Y10S 901/42
See application file for complete search history.

(56) References Cited

U.S. PATENT DOCUMENTS

| 4,333,806 | A | * | 6/1982 | Inoue | ...................... | B23H 7/06 |
| | | | | | | 219/69.12 |
| 4,386,248 | A | * | 5/1983 | Inoue | ...................... | B23H 7/02 |
| | | | | | | 219/69.12 |
| 4,743,729 | A | * | 5/1988 | Beal | ......................... | B23H 7/10 |
| | | | | | | 204/206 |

(Continued)

FOREIGN PATENT DOCUMENTS

| EP | 1642665 A1 | 4/2006 |
| JP | 59-86919 U | 6/1984 |

(Continued)

OTHER PUBLICATIONS

Extended European Search Report in EP Application No. 16182352.1, dated Nov. 15, 2016.

(Continued)

*Primary Examiner* — Geoffrey S Evans
(74) *Attorney, Agent, or Firm* — Hauptman Ham, LLP

(57) ABSTRACT

A wire electric discharge machine according to the present invention includes a multijoint robot including a wire crossing mechanism for crossing a wire electrode on its tip end, a robot controller for controlling the multijoint robot, a numerical controller for controlling the wire electric discharge machine, and a transmission unit for transmitting a coordinate position when the multijoint robot is driven and controlled to move the wire crossing mechanism from the robot controller to the numerical controller, and the numerical controller synchronizes a position of each shaft of the wire electric discharge machine with a movement of the wire crossing mechanism with reference to the coordinate position transmitted by the transmission unit.

5 Claims, 6 Drawing Sheets

(56) References Cited

U.S. PATENT DOCUMENTS

| | | | |
|---|---|---|---|
| 2004/0040936 A1* | 3/2004 | Arakawa | B23H 7/02 219/69.12 |
| 2006/0065637 A1 | 3/2006 | Kita et al. | |
| 2007/0068905 A1 | 3/2007 | Miyajima et al. | |

FOREIGN PATENT DOCUMENTS

| | | | | |
|---|---|---|---|---|
| JP | 61-226227 A | | 10/1986 | |
| JP | 63-251126 A | | 10/1988 | |
| JP | 64-4520 U | | 1/1989 | |
| JP | 6-5826 U | | 1/1994 | |
| JP | 2003-136342 A | | 5/2003 | |
| JP | 2006-95646 A | | 4/2006 | |
| JP | 2007083372 A | | 4/2007 | |
| JP | 2007-167976 A | * | 7/2007 | |
| KR | 20130053233 A | | 5/2013 | |

OTHER PUBLICATIONS

Decision to Grant a Patent in JP Patent Application No. 2015-164519, dated Oct. 24, 2017, 6 pp.

* cited by examiner

FIG.5A  CONVENTIONAL TECHNIQUE
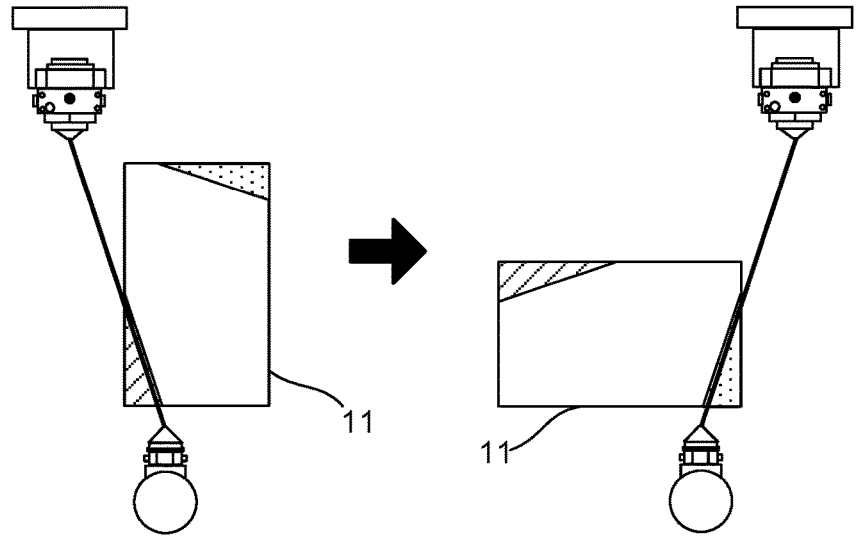
SITE a TO BE MACHINED : ▨　　SITE b TO BE MACHINED : ▦
FIG.5B  PRESENT INVENTION
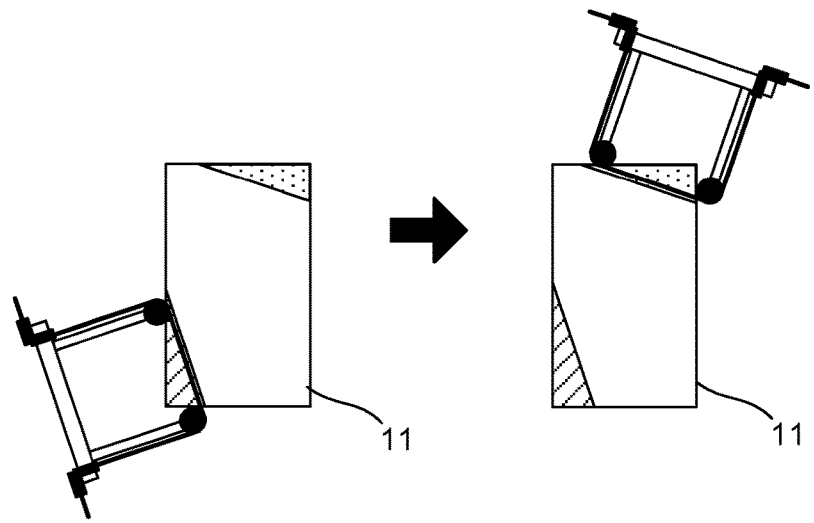
SITE a TO BE MACHINED : ▨　　SITE b TO BE MACHINED : ▦

FIG.6A   CONVENTIONAL TECHNIQUE
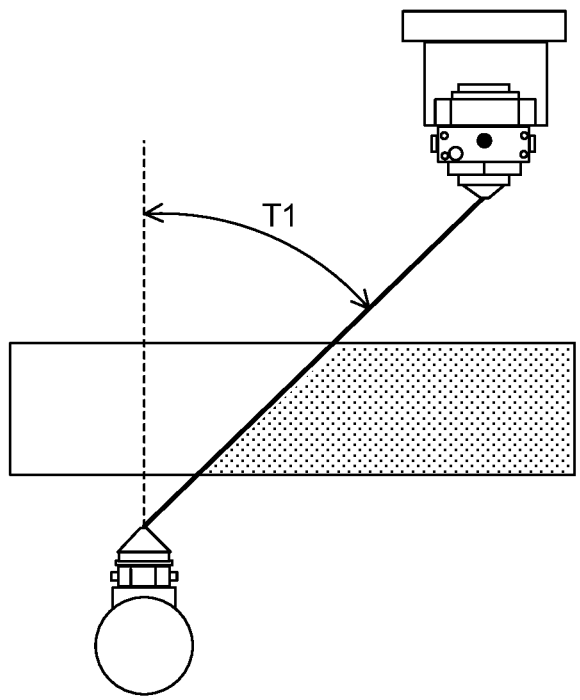
FIG.6B   EMBODIMENT
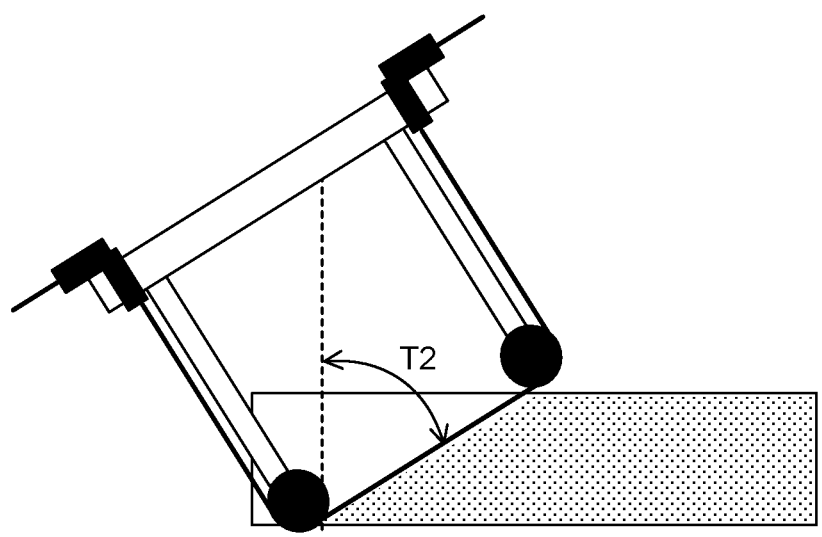

FIG.7A
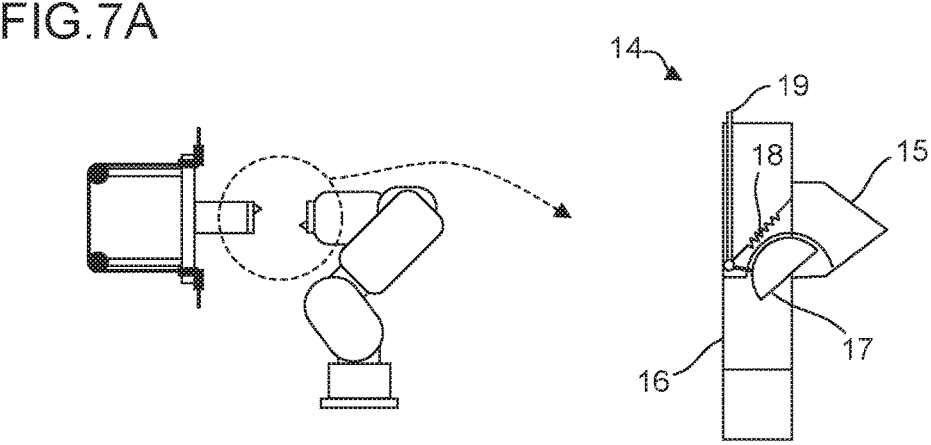
FIG.7B  COUPLING
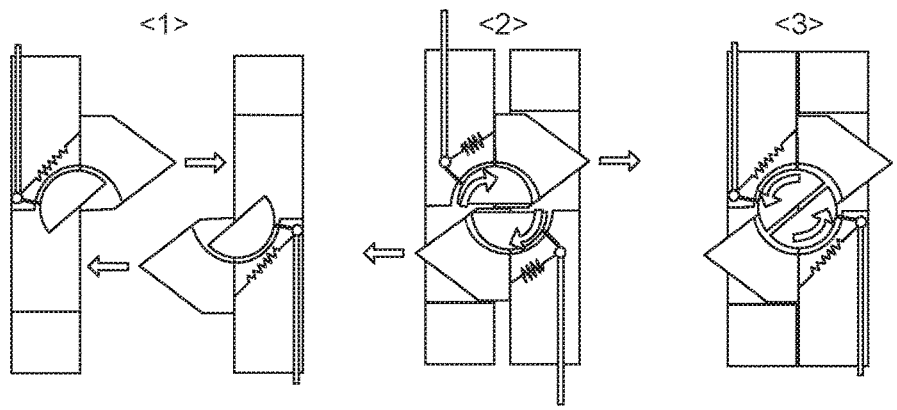
FIG.7C  DECOUPLING
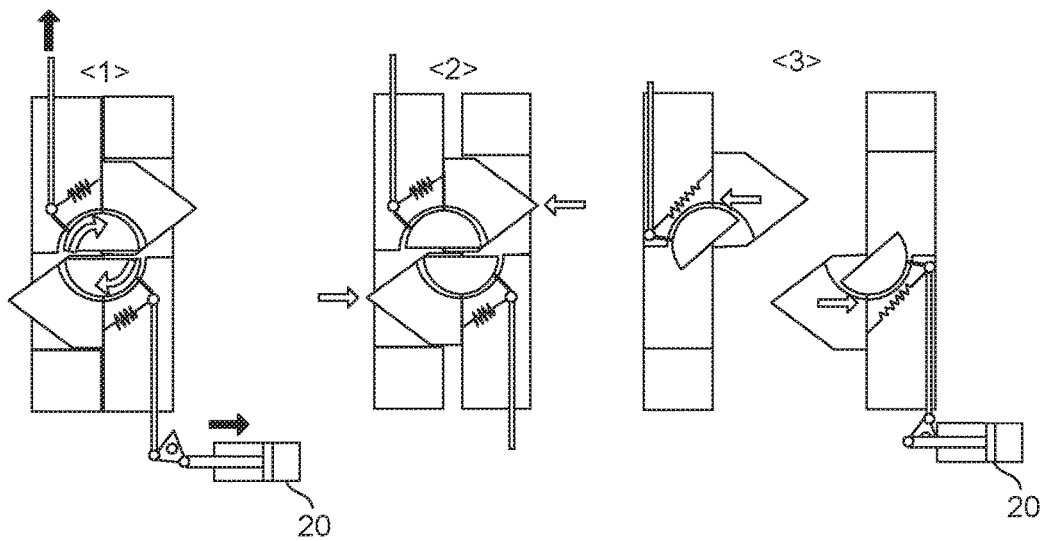

WIRE ELECTRIC DISCHARGE MACHINE CAPABLE OF MACHINING VARIOUS SURFACES

RELATED APPLICATIONS

The present application claims priority to Japanese Patent Application Number 2015-164519, filed Aug. 24, 2015, the disclosure of which is hereby incorporated by reference herein in its entirety.

BACKGROUND OF THE INVENTION

Field of the Invention

The present invention relates to a wire electric discharge machine, and particularly to a wire electric discharge machine capable of machining at a high degree of freedom without changing a posture of a work.

Wire electric discharge machining as one type of electric discharge machining is configured to machine a work into a contour shape by causing an electric discharge phenomenon between a conductive wire electrode and the work thereby to melt and scatter part of the work. A machine for performing wire electric discharge machining is denoted as wire electric discharge machine, which includes a mechanism unit for supporting a work and a wire electrode and a structure for continuously supplying the wire electrode exhausted along with an electric discharge phenomenon and controls relative positions between the wire electrode and the work by a controller such as numerical controller.

A wire electrode used in the wire electric discharge machine is generally wound on a cylindrical bobbin in a collective manner, and is drawn from the bobbin in a structure for continuously supplying the wire electrode provided in the wire electric discharge machine. The wire electric discharge machine has a guide as a structure for accurately supporting a position of the wire electrode, and has a mechanism and function of controlling extension on the wire electrode by the controller. Further, the wire electric discharge machine has a function of monitoring and controlling an electric discharge state occurring between the wire electrode and the work by the controller. Then, any movement instruction is made to the controller so that the controller controls the wire electric discharge machine in response to the movement instruction, thereby machining the work into a contour shape by the wire electrode. The wire electric discharge machine can perform 2D machining for relatively moving the wire electrode and the work in plane to be machined into a contour shape, or 2.5D machining (such as taper machining or a vertically deformed shape machining) performed at a tilt as disclosed in JP 2007-083372 A.

The wire electric discharge machine is a machine for performing contour machining by the wire electrode supported between a pair of guides, and there is a problem that wire electric discharge machining needs to be temporarily interrupted to change a posture for fixing a work when 2D machining is performed or polyhedral shapes over 2.5D machining are machined, which requires much time for a worker.

SUMMARY OF THE INVENTION

It is therefore an object of the present invention to provide a wire electric discharge machine capable of performing machining such as 2D machining or over 2.5D machining at a high degree of freedom without changing a posture of a work.

A wire electric discharge machine according to the present invention relatively moves a wire electrode and a work to perform electric discharge machining on the work, and includes: a wire crossing device including a wire crossing mechanism for crossing the wire electrode, and configured to control a position and a posture of the wire crossing mechanism; a controller for controlling the wire electric discharge machine; and a transmission unit for transmitting a coordinate position when the wire crossing mechanism is moved from the wire crossing device to the controller, wherein the controller synchronizes a position of each shaft of the wire electric discharge machine with a movement of the wire crossing mechanism with reference to the coordinate position transmitted by the transmission unit.

The wire crossing device may include a multijoint robot including the wire crossing mechanism on its tip end, and a robot controller for controlling the multijoint robot.

A position and a posture of the wire crossing mechanism may be controlled for the wire electrode crossed on the wire electric discharge machine thereby to cross the wire electrode on the wire crossing mechanism.

Each shaft of the wire electric discharge machine may be driven and controlled to move the wire electrode relative to the wire crossing mechanism, thereby crossing the wire electrode on the wire crossing mechanism.

The wire crossing mechanism may be detachably provided on the wire crossing device.

According to the present invention, it is possible to perform machining such as 2D machining or over 2.5D machining at a high degree of freedom without changing a posture of a work being machined since a posture of a robot is changed thereby to freely change an angle of a wire. Further, an operation of changing an orientation of the work can be omitted thereby to enhance a cycle time of the machining, which alleviates labor of a worker.

BRIEF DESCRIPTION OF THE DRAWINGS

The aforementioned and other objects and features of the present invention will be more apparent in the following description of an embodiment with reference to the drawings, in which:

FIGS. 5A and 5B are the diagrams for explaining a position of a work capable of being machined by the wire electric discharge machine according to the embodiment of the present invention;

FIGS. 6A and 6B are the diagrams for explaining the limit of an angle of the wire electrode according to the embodiment of the present invention; and FIGS. 7A, 7B, and 7C are the diagrams for explaining a coupling structure between the robot and the wire crossing mechanism according to the embodiment of the present invention.

DETAILED DESCRIPTION OF THE PREFERRED EMBODIMENTS

An embodiment of the present invention will be described below with reference to the drawings.

As described above, a conventional problem lies in that machining such as 2D machining cannot be performed or polyhedral shapes over 2.5D machining cannot be performed by wire electric discharge machining by merely controlling the relative positions between a pair of guides and a work and the relative positions between a pair of two guides to be offset, and the postures of the wire electrode and the work have to be changed or a work fixing method has to be changed during wire electric discharge machining.

Therefore, according to the present invention, a structure capable of crossing a wire electrode on the tip end of a multijoint robot (which will be denoted as robot below) is provided thereby to change a posture of the wire electrode by the operations of the robot, which enables wire electric discharge machining for 2D machining or polyhedral shapes over 2.5D machining to be performed without changing the work fixing method during wire electric discharge machining.

Figure 1:
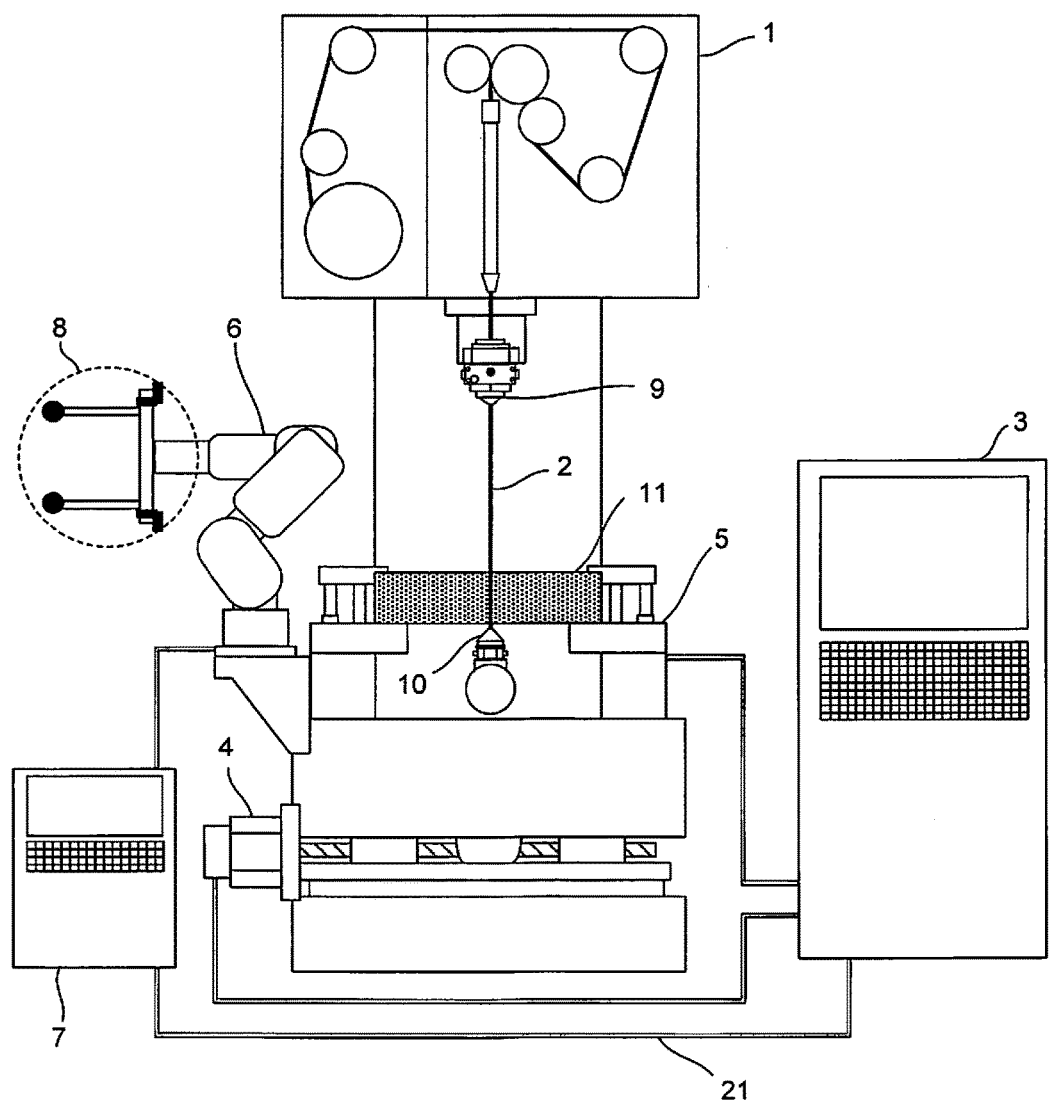
FIG. 1 is a configuration diagram of essential parts in a wire electric discharge machine provided with a robot according to an embodiment of the present invention.

FIG. 1 is a configuration diagram of essential parts in a wire electric discharge machine provided with a robot according to one embodiment of the present invention. A wire electric discharge machine 1 is a numerical control working machine for performing electric discharge machining on a work 11 by a wire electrode 2, where the relative positions between the wire electrode 2 and a work table 5 are controlled by a numerical controller 3 and a servomotor 4. Only one servomotor is illustrated in FIG. 1, but actually a drive unit such as servo motor is provided at each shaft provided in the wire electric discharge machine 1. A machining liquid used for wire electric discharge machining and a machining reservoir for saving the machining liquid therein are not illustrated.

The wire electric discharge machine 1 is attached with a robot 6 controlled by a robot controller 7. The robot controller 7 and the numerical controller 3 are connected to each other via a wired or wireless transmission unit 21 and share information on an object to be controlled therebetween so that the numerical controller 3 in the wire electric discharge machine 1 sequentially recognizes a position and a posture of the robot 6 and the robot controller 7 sequentially recognizes the positions of the wire electrode 2 and the work table 5, thereby conducting synchronized control depending on the contents recognized by the robot controller 7 and the numerical controller 3. For example, when changing a posture of the robot 6, the robot controller 7 transmits the information on coordinate positions and postures of the respective parts in the robot 6 to the numerical controller 3 in a wired or wireless manner, and the numerical controller 3 synchronizes and controls the positions of the respective axes in the wire electric discharge machine 1 with reference to the transmitted information on the coordinate positions and the postures of the respective parts in the robot 6.

The robot 6 is controlled in its posture or operations by the robot controller 7, and a wire crossing mechanism 8 is attached on the tip end of an arm of the robot 6. The wire crossing mechanism 8 is positioned or contacted around the wire electrode 2 crossed between an upper guide 9 and a lower guide 10 by the manually-operated robot 6 when the numerical controller 3 and the servo motor 4 in the wire electric discharge machine 1 are previously positioned at the control origin (mechanical origin) of the work table 5 so that the current relative positions between the wire crossing mechanism 8 attached on the tip end of the arm of the robot 6 and the wire electrode 2 are stored in the numerical controller 3 or the robot controller 7 to be shared.

Figure 2:
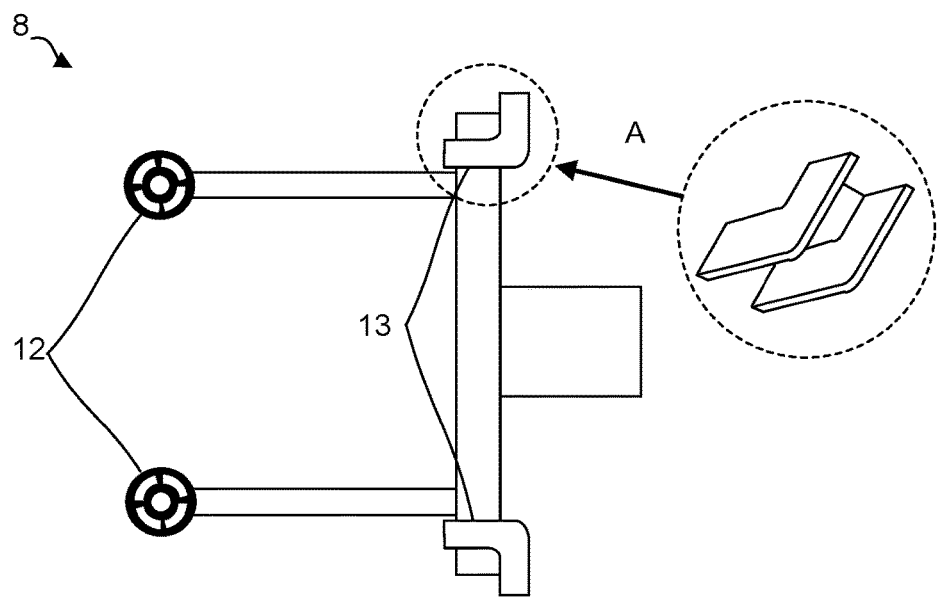
FIG. 2 is a configuration diagram of essential parts in a wire crossing mechanism according to the embodiment of the present invention.

FIG. 2 is a configuration diagram of essential parts in the wire crossing mechanism 8 attached on the tip end of the arm of the robot 6. The wire crossing mechanism 8 is formed of a plurality of rotary pulleys 12 and a support guide 13 for guiding the wire electrode 2. The parts of the pulleys 12 and the support guide 13 where the wire electrode 2 contacts are made of non-conductive materials. In the wire crossing mechanism 8 according to the present embodiment, as illustrated in FIG. 2, the support guide 13 is configured in L-shape and is formed with a groove for hooking the wire electrode 2 thereon in the direction of the arrow A in the figure, but any structure capable of supporting and preventing the wire electrode 2 from unhooking can be employed for the support guide 13.

Figures 3A, 3B:
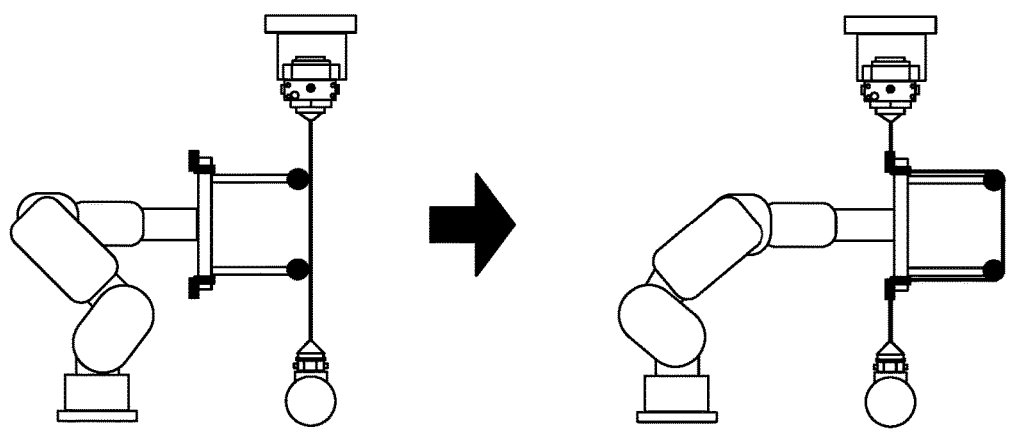
FIGS. 3A and 3B are the diagrams for explaining a method for crossing a wire electrode on the wire crossing mechanism according to the embodiment of the present invention.

Then, as illustrated in FIGS. 3A and 3B, the robot 6 and the robot controller 7 hook the wire electrode 2 on the pulleys 12 in the wire crossing mechanism 8 by a change in posture of the robot 6 (FIG. 3A), and then hook the wire electrode 2 on the support guide 13 by a further change in posture of the robot 6 (FIG. 3B) thereby to cross the wire electrode 2 crossed in the wire electric discharge machine 1 on the wire crossing mechanism 8 and to move it to a machining position instructed by a program. The operation of crossing the wire electrode 2 on the wire crossing mechanism 8 is not limited to the method by a change in posture of the robot 6, and each shaft of the wire electric discharge machine 1 may be controlled to drive the positions of the upper guide 9 and the lower guide 10, thereby moving and hooking the wire electrode 2 on the wire crossing mechanism 8, or a change in posture of the robot 6 and a movement of the wire electrode 2 may be synchronized with each other thereby to cross the wire electrode 2.

The numerical controller 3 in the wire electric discharge machine 1 is connected to the robot controller 7 of the robot 6 and shares the information therewith, and thus the numerical controller 3 recognizes a posture of the robot 6, and recognizes a position and a posture of the wire crossing mechanism 8 on the tip end of the arm of the robot 6.

Further, the numerical controller 3 in the wire electric discharge machine 1 adjusts the positions of the upper guide 9 and the lower guide 10 for supporting the wire electrode 2 in the wire electric discharge machine 1 in synchronization with a position and a posture of the wire crossing mechanism 8 on the tip end of the arm of the robot 6.

Figure 4:
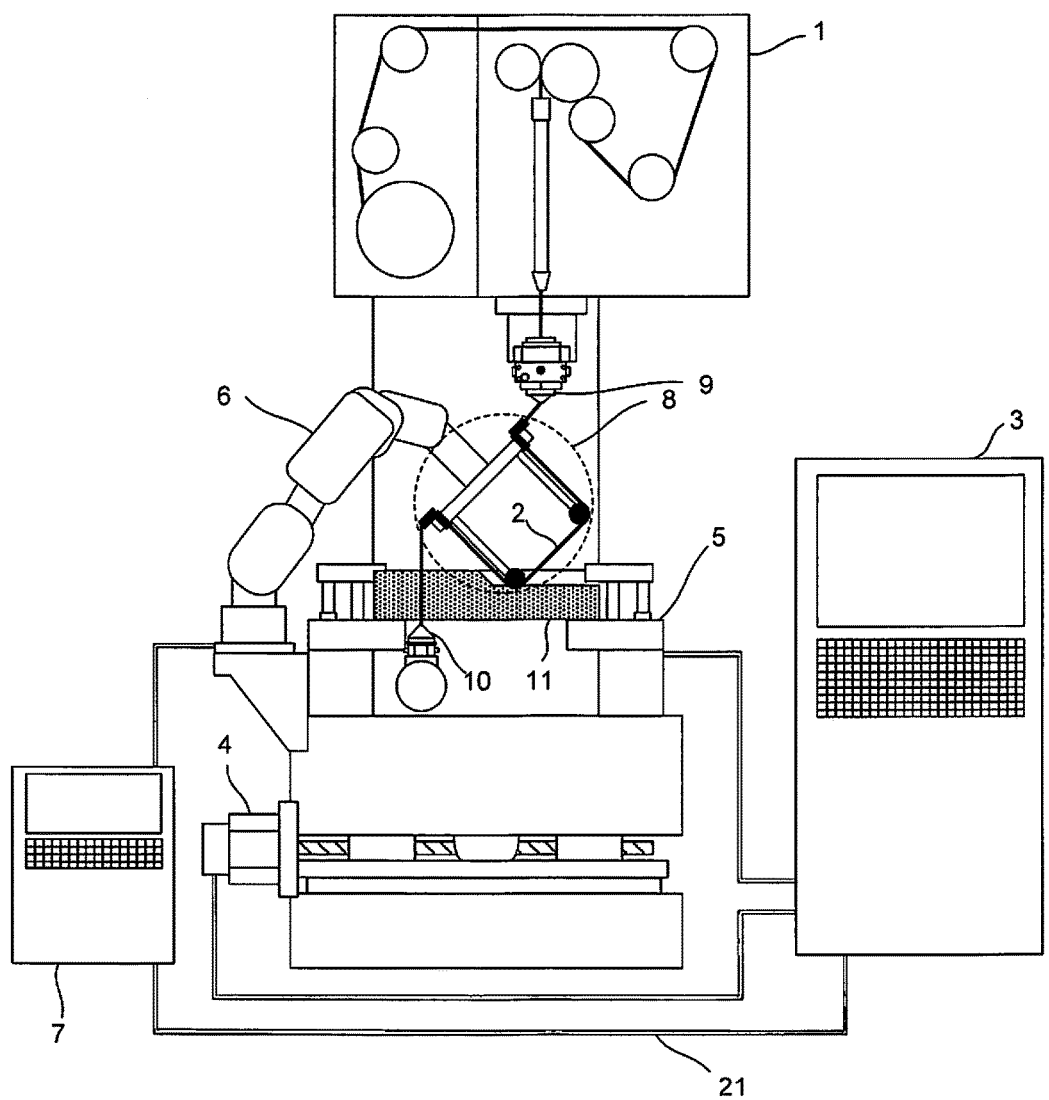
FIG. 4 is a diagram for explaining a state in which the wire electric discharge machine machines according to the embodiment of the present invention.

FIG. 4 is a diagram illustrating a state in which the wire electrode 2 is crossed on the wire crossing mechanism 8 attached on the robot 6 to be moved to the machining position of the work 11. The positions of the upper guide 9 and the lower guide 10 for supporting the wire electrode 2 in the wire electric discharge machine 1 can be fixed or changed by a program according to a shape of the work 11 or a method for fixing the same, and a shape to be machined into the work 11, but a posture in which the wire electrode 2 is crossed on the wire crossing mechanism 8 on the tip end of the arm is maintained by changing a posture of the robot 6 depending on the positions of the upper guide 9 and the lower guide 10.

The numerical controller 3 in the wire electric discharge machine 1 has the information on the positions or postures of the robot 6 and the wire crossing mechanism 8 on the tip end of the arm, and the operator can arbitrarily confirm the operations and the operation trajectories of the robot 6 and the wire crossing mechanism 8 on the tip end of the arm depending on a shape to be machined on a display.

With the structure, for example, as illustrated in FIGS. 5A and 5B, for machining a site a to be machined and a site b to be machined of a work, an orientation of the work needs to be changed after the site a to be machined is machined and before the site b to be machined is machined in a conventional technique, while according to the present invention, the site b to be machined can be machined by changing a posture of the robot 6 after the site a to be machined is machined, thereby omitting the operation of changing an orientation of the work, and the operation of changing an orientation of the work can be omitted in this way so that a positional offset of the work, which occurs when an orientation of the work is changed, can be prevented.

Further, according to the conventional technique, the relative positions between the upper guide 9 and the lower guide 10 are offset thereby to perform taper machining of performing wire electric discharge machining by tilting the wire electrode 2 from the vertical state. Generally, the guide of the wire electrode is a centrally-perforated mortar shape through which the wire electrode passes, and is configured such that the wire electrode slides on the guide surface, and when the angle of the wire electrode exceeds 45 degrees due to a change in relative positions between the upper guide 9 and the lower guide 10, a load is imposed on the part supporting the wire electrode 2, and thus the wire electrode 2 may be disconnected. Therefore, the limit of the angle is between the vertical position and 45 degrees.

However, according to the present embodiment, the support using rotators such as pulleys is enabled by the wire crossing mechanism 8 due to a change in posture of the robot 6, and thus a load is difficult to apply on the wire electrode 2 even beyond 45 degrees from the vertical position, and taper machining at a larger angle than conventionally is enabled. For example, as illustrate in FIGS. 6A and 6B, assuming a limit angle of the wire electrode 2 according to the conventional technique as T1 (FIG. 6A) and a limit angle of the wire electrode 2 according to the present embodiment as T2 (FIG. 6B), T2 may be larger than T1.

The wire crossing mechanism 8 attached on the tip end of the arm of the robot 6 has a similar structure to railway couplers, which enables to couple with or decouple from the robot 6 by the operations of the robot 6 or the manual operations of the worker.

FIGS. 7A, 7B, and 7C are the diagrams illustrating exemplary coupling structures between the robot 6 and the wire crossing mechanism 8. Coupling structures 14 are provided on the tip end of the arm of the robot 6 and at the wire crossing mechanism 8 according to the present embodiment, respectively, over their coupling part, where guides (male) 15 are inserted into guides (female) 16.

Further, a rotary lock 17 is kept in the state illustrated at the upper right part of FIG. 7A relative to the coupling structures 14 by a return spring 18, and is assembled in cylindrical grooves provided in the coupling structures 14 such that it circumferentially rotates depending on applied force when the guides (male) 15 are inserted into the guides (female) 16 and a release rod 19 is pulled outward from the coupling structures 14.

When the coupling structures 14 provided on the tip end of the arm of the robot 6 and at the wire crossing mechanism 8 are coupled with each other, the guides (male) 15 are closed and inserted into the guides (female) 16, respectively, as illustrated in <1> in FIG. 7B so that the rotary lock 17 is pressed by the guides (male) 15 to circumferentially rotate as illustrated in <2> in FIG. 7B, the guides (male) 15 can be deeply inserted into the guides (female) 16, the rotary lock 17 returns to the original position by the return spring 18 as illustrated in <3> in FIG. 7B when the coupling parts are tightly contacted, and thus the coupling parts enter inseparable.

On the other hand, when the coupling structures 14 are decoupled from each other, the release rod 19 is operated manually when the worker manually decouples or by a pneumatic cylinder 20 in response to an instruction from the numerical controller 3 or the robot controller 7 as illustrated in <1> in FIG. 7C so that the rotary lock 17 circumferentially rotates, the coupling parts can be decoupled as illustrated in <2> in FIG. 7C, and the rotary lock 17 returns to the original position by the return spring 18 when the coupling parts are completely decoupled as illustrated in <3> in FIG. 7C.

The embodiment of the present invention has been described above, but the present invention is not limited to only the embodiment described above, and may be modified as needed and accomplished in various forms.

For example, the embodiment has described the structure in which the wire crossing mechanism 8 is coupled with the multijoint robot 6 and controls it, but is not limited thereto, and any structure capable of driving and controlling the wire crossing mechanism 8 to be changed to a predetermined posture may be employed.

The C-shaped wire crossing mechanism 8 is described above, but there may be configured such that two drive units including a structure for supporting the wire electrode 2 at its tip end, such as pulleys, are provided and the two drive units as well as the upper guide 9 and the lower guide 10 are synchronized to be driven and controlled, thereby crossing the wire electrode 2.

The embodiment of the present invention has been described above, but the present invention is not limited to the above embodiment of the present invention, and may be changed as needed and accomplished in other forms.

The invention claimed is:

1. A wire electric discharge machine for relatively moving a wire electrode and a work to perform electric discharge machining on the work, the wire electric discharge machine comprising:
    a controller for controlling the wire electric discharge machine; and
    a wire crossing device including a wire crossing mechanism for crossing the wire electrode, the wire crossing device configured to
        control a position and a posture of the wire crossing mechanism, and
        transmit a coordinate position, when the wire crossing mechanism is moved, from the wire crossing device to the controller,
    wherein the controller synchronizes a position of each shaft of the wire electric discharge machine with a movement of the wire crossing mechanism with reference to the coordinate position transmitted by the wire crossing device.

2. The wire electric discharge machine according to claim 1,
    wherein the wire crossing device includes a multijoint robot including the wire crossing mechanism on its tip end, and a robot controller for controlling the multijoint robot.

3. The wire electric discharge machine according to claim 1,
wherein the wire crossing device is configured to control the position and posture of the wire crossing mechanism to move the wire crossing mechanism relative to the wire electrode, thereby crossing the wire electrode on the wire crossing mechanism.

4. The wire electric discharge machine according to claim 1,
wherein the controller is configured to drive and control each shaft of the wire electric discharge machine to move the wire electrode relative to the wire crossing mechanism, thereby crossing the wire electrode on the wire crossing mechanism.

5. The wire electric discharge machine according to claim 1,
wherein the wire crossing device further includes a coupling structure, and the wire crossing mechanism is detachably coupled to a part of the wire crossing device via the coupling structure.

* * * * *